(12) United States Patent
Wende

(10) Patent No.: US 9,964,638 B2
(45) Date of Patent: May 8, 2018

(54) METHOD AND PASSENGER INFORMATION SYSTEM FOR PROVIDING FLIGHT INFORMATION DATA

(71) Applicant: LUFTHANSA TECHNIK AG, Hamburg (DE)

(72) Inventor: Gerko Wende, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 624 days.

(21) Appl. No.: 14/408,156

(22) PCT Filed: May 29, 2013

(86) PCT No.: PCT/EP2013/001587
§ 371 (c)(1),
(2) Date: Dec. 15, 2014

(87) PCT Pub. No.: WO2013/185886
PCT Pub. Date: Dec. 19, 2013

(65) Prior Publication Data
US 2015/0123837 A1 May 7, 2015

(30) Foreign Application Priority Data
Jun. 15, 2012 (DE) .................. 10 2012 210 149

(51) Int. Cl.
*G01S 13/74* (2006.01)
*B64D 11/00* (2006.01)
*H04N 7/18* (2006.01)

(52) U.S. Cl.
CPC .......... *G01S 13/74* (2013.01); *B64D 11/0015* (2013.01); *H04N 7/18* (2013.01)

(58) Field of Classification Search
CPC .......... G01S 13/74; B64D 11/0015–11/00155; H04N 7/18
USPC ............................................................ 342/60
See application file for complete search history.

(56) References Cited

U.S. PATENT DOCUMENTS

| 3,660,847 | A | * | 5/1972 | Danaher | ............ | B64D 11/0015 |
| | | | | | | 342/452 |
| 4,584,603 | A | * | 4/1986 | Harrison | ............ | B64D 11/0015 |
| | | | | | | 244/118.5 |
| 4,647,980 | A | * | 3/1987 | Steventon | .......... | B64D 11/0015 |
| | | | | | | 348/837 |
| 4,975,696 | A | * | 12/1990 | Salter, Jr. | ............... | G01C 23/00 |
| | | | | | | 340/973 |
| 5,077,673 | A | * | 12/1991 | Brodegard | .............. | G01S 13/74 |
| | | | | | | 342/29 |
| 5,574,648 | A | * | 11/1996 | Pilley | ..................... | G01C 23/00 |
| | | | | | | 340/945 |

(Continued)

OTHER PUBLICATIONS

Funkwek Avionics GmbH, RTH60 ADS-B / Mode S Receiver product specification sheet, Mar. 2010, pp. 1-2.

*Primary Examiner* — Peter M Bythrow
(74) *Attorney, Agent, or Firm* — Saliwanchik, Lloyd & Eisenschenk

(57) ABSTRACT

Method for providing flight information data for a passenger in an aircraft, wherein the flight information data are transmitted from a cockpit system in the aircraft to at least one passenger information system in the same aircraft, wherein the flight information data are transmitted as a secondary radar signal and/or monitoring signal and received by the at least one passenger information system.

18 Claims, 1 Drawing Sheet

(56) References Cited

U.S. PATENT DOCUMENTS

Figure 1:
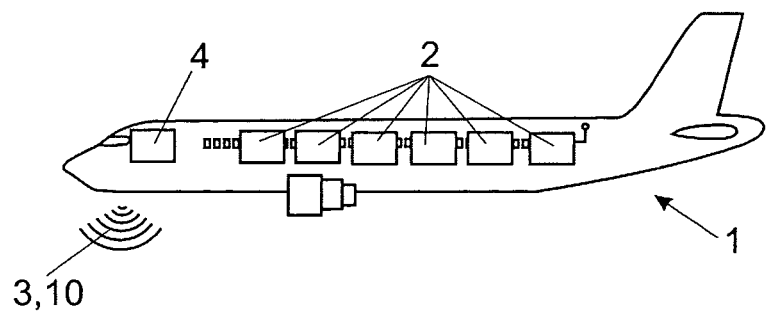

| | | | | |
|---|---|---|---|---|
| 5,596,326 A * | 1/1997 | Fitts | G01S 13/878 | 342/30 |
| 5,835,127 A * | 11/1998 | Booth | B64D 11/0015 | 725/76 |
| 5,884,219 A * | 3/1999 | Curtwright | G01C 21/20 | 340/990 |
| 5,929,895 A * | 7/1999 | Berry | H04H 20/62 | 348/E7.05 |
| 5,999,882 A * | 12/1999 | Simpson | G06Q 10/047 | 702/3 |
| 6,313,783 B1 * | 11/2001 | Kuntman | G01S 13/76 | 342/29 |
| 6,384,783 B1 * | 5/2002 | Smith | G01S 5/0081 | 342/387 |
| 6,477,152 B1 * | 11/2002 | Hiett | H04B 7/18508 | 370/310 |
| 6,661,353 B1 * | 12/2003 | Gopen | B64D 11/00155 | 340/963 |
| 6,694,249 B1 * | 2/2004 | Anderson | G01C 23/00 | 340/947 |
| 6,748,597 B1 * | 6/2004 | Frisco | G06Q 30/02 | 348/E7.05 |
| 7,124,426 B1 * | 10/2006 | Tsuria | B64D 11/00151 | 348/E7.061 |
| 7,587,733 B2 * | 9/2009 | Keen | H04N 21/441 | 725/76 |
| 7,707,612 B2 * | 4/2010 | Frisco | H04H 20/62 | 714/57 |
| 7,769,398 B2 * | 8/2010 | Marston | H04N 7/106 | 340/1.1 |
| 7,786,899 B2 * | 8/2010 | Baker | G08G 5/0021 | 340/945 |
| 8,594,931 B2 * | 11/2013 | Sterkel | H04H 60/51 | 701/454 |
| 9,015,775 B2 * | 4/2015 | Perlman | H04N 7/24 | 725/74 |
| 9,016,627 B2 * | 4/2015 | Margis | B60N 2/4876 | 244/118.5 |
| 2003/0009267 A1 * | 1/2003 | Dunsky | G08G 5/0043 | 701/3 |
| 2005/0007272 A1 * | 1/2005 | Smith | G01S 5/06 | 342/189 |
| 2008/0036659 A1 * | 2/2008 | Smith | G01S 13/765 | 342/454 |
| 2009/0081947 A1 * | 3/2009 | Margis | H04B 7/18508 | 455/3.02 |
| 2009/0146875 A1 * | 6/2009 | Hovey | G08G 5/04 | 342/357.31 |
| 2009/0187640 A1 * | 7/2009 | Delia | G06Q 10/00 | 709/219 |
| 2009/0282469 A1 * | 11/2009 | Lynch | H04W 12/06 | 726/11 |
| 2012/0232791 A1 * | 9/2012 | Sterkel | H04H 60/51 | 701/454 |

* cited by examiner

METHOD AND PASSENGER INFORMATION SYSTEM FOR PROVIDING FLIGHT INFORMATION DATA

CROSS-REFERENCE TO RELATED APPLICATIONS

The present application is the U.S. National Stage Application of International Patent Application No. PCT/EP2013/001587, filed on May 29, 2013, which claims priority to German Patent Application No. 10 2012 210 149.7, filed on Jun. 15, 2012, both of which are hereby incorporated by reference herein in their entirety, including any figures, tables, or drawings.

The invention relates to a method for providing flight information data for a passenger in an aircraft having the features of the preamble of claim 1, and to a corresponding passenger information system for providing flight information data having the features of the preamble of claim 9.

It is common in aircraft to provide flight information to the passengers via passenger information systems such as in-flight information systems or in-flight entertainment systems, for example. For example, flight altitude, aircraft position, speed, travel destination, etc. are displayed on a monitor so that the passenger has accurate information on the actual location of the aircraft and the remaining time to the travel destination, for example.

This flight information data is transmitted by means of wired interfaces from the cockpit systems to the cabin systems, which also include the passenger information systems. For this purpose, standard interfaces such as the data bus standard ARINC-429, for example, are defined. As an alternative, network connections such as Ethernet connections, for example, can also be used for this purpose.

In any case, the interfaces and methods for providing flight information data are to be configured and designed such that unintentional influence on the cockpit systems by the cabin systems is technically precluded. Use of such a data connection or a correspondingly connected passenger information system is permitted according to aviation law only with appropriate verification.

This special mandatory design and verification involve significant technical and administrative effort in development, production and installation of cabin systems.

It is therefore an object of the invention to provide a method and a corresponding passenger information system for providing flight information data in which the described problems are reduced.

The invention achieves this object with the features of the independent claims. Thus, for achieving the object, a method for providing flight information data for a passenger in an aircraft is proposed wherein the flight information data is transmitted from a cockpit system of the aircraft to at least one passenger information system in the same aircraft, and wherein the flight information data is transmitted as a secondary radar signal and/or monitoring signal, and is received by the at least one passenger information system.

For achieving the object, a corresponding passenger information system for providing flight information data for a passenger in an aircraft is also proposed according to the invention, wherein the passenger information system comprises a receiver module which is configured for receiving a secondary radar signal emitted by the aircraft and/or for receiving a monitoring signal emitted by the aircraft, and which is configured for processing and outputting the flight information data contained therein. In addition, the flight information data can also be decoded in the process.

The monitoring signal is preferably an automatic continuously transmitted signal which, for example, can be an air traffic control system for displaying the aircraft movements in the airspace. Via such a monitoring signal, the aircraft continuously transmits flight information that can be received and evaluated by ground stations.

Moreover, aircraft transmit certain flight information as a secondary radar signal. The secondary radar differs from a primary radar in that no passive reflection takes place at the target, but, rather, the secondary radar signal responds to an inquiry with a response signal. Thus, for example, aircraft respond to an inquiry transmitted from the ground with relevant flight information such as flight number or flight altitude via a transponder present in the aircraft. The aircraft to be monitored respond actively to a received radar signal by transmitting a response on the same or on a different frequency. In the system used in civil aviation, the query is normally transmitted on the 1030 MHz frequency, and the response is transmitted on the 1090 MHz frequency.

Within the host aircraft, the secondary radar signal and/or the monitoring signal is/are received and evaluated without detours through the passenger information system. Thus, no special wired data connection between the cockpit system and the passenger information system is provided; instead, within the host aircraft, the flight information data is transmitted by radio via the monitoring signal and/or the secondary radar signal, which is/are transmitted by default, from the cockpit system to the passenger information system and can be evaluated there. The flight information data is transmitted as a secondary radar signal and/or monitoring signal, and is also received as a secondary radar signal and/or monitoring signal by the at least one passenger information system.

Due to this usage of the signals which are transmitted from the aircraft anyway, and the actual purpose of which is not reception in the host transmitting aircraft, the normally provided cable connection can be dispensed with. As a result, the overall aircraft is lighter and the expenditure of effort for installation is low.

Moreover, by using the secondary radar signal and/or monitoring signal in the host aircraft, installation and certification under aviation law of the passenger information system can be significantly simplified. In fact, the verification that the cockpit systems are not influenced, which is required for the certification under aviation law, can be provided in a very simple manner. The cockpit systems such as, for example, the flight instruments of the avionics, must not be negatively affected by the passenger information system or the transmission of information to the passenger information system.

If a new data connection from a cockpit system to the cabin is intended, this verification must be provided with considerable effort. In contrast, in the method according to the invention or the passenger information system according to the invention, a signal is used which is transmitted anyway, and a passive receiver provided in the cabin does not interfere with the cockpit systems.

In the method according to the invention or the passenger information system according to the invention, several aspects are advantageous, as explained below.

The flight information data is preferably transmitted according to the "Mode-Selective" standard, also called Mode S, from the cockpit system to the at least one passenger information system.

The Mode S standard is a standard defined by the International Civil Aviation Organization (ICAO). According to Mode S, each aircraft has a transponder with a pre-programmed individual address. In this manner, in the event of a query, only transponders predetermined by their address are addressed, so that an excessive number of undesirable response signals is not generated.

Moreover, Mode S is advantageous for the invention since via Mode S, a comparatively large amount of flight information data can be transmitted from the cockpit system to the passenger information system.

The ADS-B signal continuously emitted by the aircraft is preferably used as the monitoring signal. The ADS-B signal is the so-called "Automatic Dependent Surveillance" signal, also called ADS-broadcast or ADS-B for short.

In the ADS-B method, aircraft autonomously transmit a non-directional signal once every second, for example, which contains flight information data such as, for example, flight number, type of aircraft, speed, flight altitude and planned flight course. This flight information data is transmitted via the ADS-B signal, which is continuously emitted by the aircraft, from the cockpit system to the at least one passenger information system and is subsequently received, decoded, processed and output for the passenger by the passenger information system.

Accordingly, for receiving the flight information data transmitted by the aircraft, the receiver module of the passenger information system preferably has a "Mode-Selective" receiver and/or an ADS-B receiver. Both receivers are preferably implemented in a receiver module.

In a preferred embodiment of the invention, further flight information data from the at least one passenger information system and/or an additional data connection is used for processing.

The further flight information data can be stored, for example, in databases of the flight information system or can be retrieved via an Internet connection. In this manner, even flight information data that is not transmitted by default by the secondary radar signal and/or monitoring signal can be displayed to the passenger.

For example, it is preferred to determine from the at least one passenger information system the place of departure and/or arrival of the aircraft based on the flight number of the aircraft received via the secondary radar signal and/or monitoring signal. This can take place by comparing the flight number to an entry in a database of the flight information system, or can be retrieved via an Internet connection, for example. Thus, for processing the received flight information data, the passenger information system is preferably configured for using additional data from a database of the passenger information system and/or from an additional data connection.

In one embodiment of the invention it is preferred that the at least one passenger information system evaluates and co-processes signals transmitted from the ground by a traffic information service. A system preferred for this purpose is the "Traffic Information Service" (TIS), via which, for example, weather data, information about approaching aircraft and flight clearances are transmitted to the aircraft. This information can also be read and evaluated by the passenger information system in order to present even more comprehensive flight information to the passenger.

In another preferred embodiment of the invention, the at least one passenger information system receives the flight information data from a secondary radar signal and/or an ADS-B signal of a further aircraft, processes this flight information data and outputs it to the passenger. The same as for the aircraft in which the passenger information system according to the invention is located, other aircraft also transmit their flight information via secondary radar and/or ADS-B.

When these further aircraft are located in the surrounding area of the passenger information system, the latter can also evaluate this data. Furthermore, it is possible that the passenger information system supplements or completely retrieves this data via an additional data connection.

In this manner, it can be accurately displayed on a monitor to the passenger where an aircraft is flying, which he/she can simultaneously observe through the window, for example. In principle, the flight information data of further aircraft can be evaluated in exactly the same way as the data of the host aircraft, and can preferably be shown in a map display in the cabin.

Figure 2:
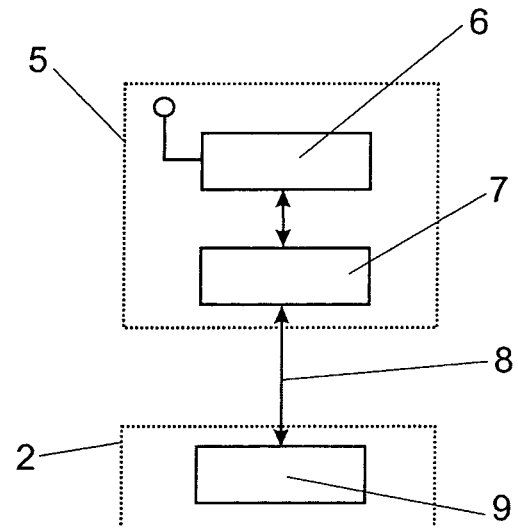

The invention is explained hereafter by means of preferred embodiments with reference to the attached figures. In the figures:

FIG. 1 shows a side view of an aircraft having a plurality of passenger information systems; and FIG. 2 shows a schematic view of a passenger information system according to the invention.

FIG. 1 illustrates an aircraft 1 which transmits both a secondary radar signal 3 and a monitoring signal 10.

The secondary radar signal 3 is a signal generated in Mode-Selective (Mode S), and the monitoring signal 10 is a signal that is emitted continuously (at regular intervals) using the ADS-B method.

The secondary radar signal 3 and the monitoring signal 10 contain flight information data such as, for example, the aircraft identification (tail sign), the flight number, the aircraft position, flight altitude, course, climb or descent rates, and inclination and/or speed of the aircraft. This flight information data is emitted by the aircraft 1 at certain intervals according to corresponding specifications or is transmitted as a response signal.

A plurality of passenger information systems 2 is provided in the aircraft 1 for the passengers of the aircraft 1. These passenger information systems 2 can be, for example, in-flight entertainment systems and/or in-flight information systems via which flight information data is provided to the passengers.

According to the invention, this flight information data is transmitted from a cockpit system 4 to at least one passenger information system 2 via the secondary radar signal and/or monitoring signal 3, 10. No special signal is generated for the passenger information system 2; instead, the passenger information system 2 receives such secondary radar signals and/or monitoring signals 3 which are transmitted by the aircraft 1 anyway. The cockpit system 4 can be a flight instrument of the aircraft avionics, for example.

For this purpose, at least one passenger information system 2 has a receiver module 5, which is illustrated in greater detail in FIG. 2.

FIG. 2 shows a passenger information system 2 which is connected to the receiver module 5 via a data connection 8. This can be, for example, a receiver module 5 which comprises a "Mode-Selective" receiver and/or an ADS-B receiver. Accordingly, the ADS-B receiver is preferably implemented together with the "Mode-Selective" receiver in a receiver module 5.

The receiver module 5 has a high-frequency module 6 and a data preprocessing unit 7. After the secondary radar signal 3 and/or the monitoring signal 10 has/have been received by the high-frequency module 6, it/they is/are decoded and preprocessed in the data preprocessing unit. The secondary radar signal 3 and/or the monitoring signal 10 is/are subsequently transmitted to a processing unit 9 in the passenger information system via the data connection 8, which is preferably implemented as a USB data connection.

The flight information data contained in the secondary radar signal or monitoring signal 3 is evaluated by the data processing unit 9 and preferably supplemented with further flight information data. This further flight information data can be retrieved from an Internet connection, for example. It is also possible and preferred to retrieve the further flight information data from a database provided in the passenger information system 2.

In this manner, the travel destination can be determined based on the flight number, for example. For displaying to the passenger, an output device, for example a monitor, is preferably provided on which the flight information data is displayed. A map display is preferably generated on which the host aircraft 1 is displayed and surrounding aircraft 1 are displayed, the flight information data of which can be received, for example, via the ADS-B receiver.

LIST OF REFERENCE NUMERALS

1 aircraft
2 passenger information system
3 secondary radar signal
4 cockpit system
5 receiver module
6 high-frequency module
7 data preprocessing unit
8 data connection
9 processing unit
10 monitoring signal

The invention claimed is:

1. A method for providing flight information data for one or more passengers in an aircraft, comprising:
   transmitting a flight information data signal from a cockpit system of an aircraft to at least one passenger information system in the aircraft,
   wherein the flight information data signal is a "Mode-Selective" standard signal,
   wherein the at least one passenger information system is a cabin system,
   wherein the at least one passenger information system is an in-flight entertainment system and/or in-flight information system,
   wherein the flight information data signal comprises flight information data,
   wherein the at least one passenger information system comprises at least one receiver module, and
   wherein the at least one receiver module comprises a Mode-Selective receiver and/or an ADS-B receiver;
   receiving the flight information data signal via the at least one receiver module; and
   processing the flight information data signal via the at least one receiver module to produce flight information data,
   wherein the flight information data signal comprises:
      a secondary radar signal,
         wherein the secondary radar signal is transmitted from the cockpit of the aircraft for a purpose other than reception via the at least one receiver module; and/or
      a monitoring signal,
         wherein the monitoring signal is an Automatic Dependent Surveillance (ADS-B) signal,
         wherein the monitoring signal is an automatic continuously transmitted signal that is part of an air traffic control system for displaying aircraft movements in the airspace, and
         wherein the monitoring signal is transmitted from the cockpit of the aircraft for a purpose other than reception via the at least one receiver module.

2. The method according to claim 1,
wherein the flight information data signal is the secondary radar signal.

3. The method according to claim 1,
wherein the flight information data signal is the secondary radar signal and the monitoring signal.

4. The method according to claim 1,
wherein the flight information data signal is the monitoring signal.

5. The method according to claim 1,
wherein the at least one receiver module is a first receiver module,
wherein the at least one passenger information systems comprises a plurality of passenger information systems,
wherein each passenger information system of the plurality of passenger information systems receives the flight information data from the first receiver module;
wherein the method further comprises:
   processing the flight information data via each passenger information system of the plurality of passenger information systems to produce a corresponding plurality of output flight information data; and
   providing at least a portion of one or more output flight information data of the plurality of output flight information data to one or more passengers via a corresponding one or more passenger information systems of the plurality of passenger information systems.

6. The method according to claim 1,
wherein each passenger information system of the at least one passenger information system comprises a corresponding receiver module of the at least one receiver module, wherein the method further comprises:
processing the flight information data via the at least one passenger information system to produce output flight information data; and
providing at least a portion of the output flight information data to one or more passengers via the at least one passenger information system.

7. The method according to claim 6,
wherein the at least one receiver module comprises a corresponding plurality of receiver modules,
wherein receiving the flight information data signal via the at least one receiver module comprises:
   receiving the flight information data signal via each receiver module of the plurality of receiver modules,
wherein the at least one passenger information system comprises a plurality of passenger information systems,
wherein processing the flight information data via the at least one passenger information system to produce output flight information data comprises:
   processing the flight information data via each passenger information system of the plurality of passenger information systems to produce a corresponding plurality of output flight information data,
wherein providing at least a portion of the output flight information data to one or more passengers via the at least one passenger information system comprises:
   providing at least a portion of one or more output flight information data of the plurality of output flight information data to one or more passengers via a corresponding one or more passenger information systems of the plurality of passenger information systems.

8. The method according to claim 6, further comprising:
retrieving additional flight information data from one or more of the following:
a database provided in the at least one passenger information system; and
an additional data connection;
wherein processing the flight information data via the at least one passenger information system to produce output flight information data comprises:
processing the flight information data and the additional flight information data via the at least one passenger information system to produce output flight information data.

9. The method according to claim 8,
wherein the flight information data includes a flight number of the aircraft,
wherein the output flight information data includes a place of departure of the aircraft and a place of arrival of the aircraft.

10. The method according to claim 6, further comprising:
receiving one or more signals transmitted from the ground via at least one traffic information service; and
processing the one or more signals transmitted from the ground via at least one traffic information service to produce additional flight information data,
wherein processing the flight information data via the at least one passenger information system to produce output flight information data comprises:
processing the flight information data and the additional flight information data to produce output flight information data.

11. The method according to claim 8, further comprising:
receiving the at least one additional flight information data signal transmitted from an additional cockpit system of a corresponding additional aircraft, wherein the at least one additional flight information data signal comprises one or more of the following:
an additional secondary radar signal; and
an additional Automatic Dependent Surveillance (ADS-B) signal emitted by the additional aircraft;
processing the at least one additional flight information data signal via the at least one receiver to determine second flight information data from the at least one additional flight information data signal.

12. A system for providing flight information data for one or more passengers in an aircraft, comprising:
a transmitter,
wherein the transmitter transmits a flight information data signal from a cockpit system of an aircraft to at least one passenger information system in the aircraft,
wherein the flight information data signal is a "Mode-Selective" standard signal,
wherein the at least one passenger information system is a cabin system,
wherein the at least one passenger information system is an in-flight entertainment system and/or in-flight information system,
wherein the flight information data signal comprises flight information data,
wherein the at least one passenger information system comprises a receiver module,
wherein the receiver module comprises a Mode-Selective receiver and/or an ADS-B receiver,
wherein the receiver module is configured to:
receive the flight information data signal,
wherein the flight information data signal comprises:
a secondary radar signal,
wherein the secondary radar signal is transmitted from the cockpit of the aircraft for a purpose other than reception via the at least one receiver module; and/or
a monitoring signal,
wherein the monitoring signal is an Automatic Dependent Surveillance (ADS-B) signal,
wherein the monitoring signal is an automatic continuously transmitted signal that is part of an air traffic control system for displaying aircraft movements in the airspace, and
wherein the monitoring signal is transmitted from the cockpit of the aircraft for a purpose other than reception via the receiver module;
process the received flight information data signal to determine flight information data from the flight information data signal; and
output the flight information data.

13. The system according to claim 12,
wherein the flight information data signal is the monitoring signal, and
wherein the receiver module comprises an ADS-B receiver.

14. The system according to claim 12,
wherein the flight information data signal is the secondary radar signal, and
wherein the receiver module comprises a "Mode-Selective" receiver.

15. The system according to claim 12,
wherein the flight information data signal is the secondary radar signal and the monitoring signal,
wherein the receiver module comprises a "Mode-Selective" receiver, and
wherein the receiver module comprises an ADS-B receiver.

16. The system according to claim 12,
wherein the system is configured to:
retrieve additional flight information data from one or more of the following:
a database provided in the at least one passenger information system; and
an additional data connection;
wherein the system further comprises a processing unit, wherein the processing unit
(i) receives the flight information data from the receiver module; and
(ii) processes the flight information data and the additional flight information data to produce output flight information data,
wherein the system is configured to provide at least a portion of the output flight information data to one or more passengers.

17. The system according to claim 13,
wherein the system is configured to:
retrieve additional flight information data from one or more of the following:
a database provided in the at least one passenger information system; and
an additional data connection;
wherein the system further comprises a processing unit, wherein the processing unit
(i) receives the flight information data from the receiver module; and (ii) processes the flight information data and the additional flight information data to produce output flight information data; and wherein the system is configured to provide at least a portion of the output flight information data to one or more passengers.

18. The system according to claim 14,
wherein the system is configured to:
retrieve additional flight information data from one or more of the following:
a database provided in the at least one passenger information system; and
an additional data connection;
wherein the system further comprises a processing unit, wherein the processing unit
(i) receives the flight information data from the receiver module; and
(ii) processes the flight information data and the additional flight information data to produce output flight information data,
wherein the system is configured to provide at least a portion of the output flight information data to one or more passengers.

\* \* \* \* \*